April 28, 1953 G. HAMMERSCHLAG 2,636,523
MACHINE FOR MANUFACTURING MASS ARTICLES OF BENT WIRE
Filed Feb. 28, 1950 5 Sheets-Sheet 1
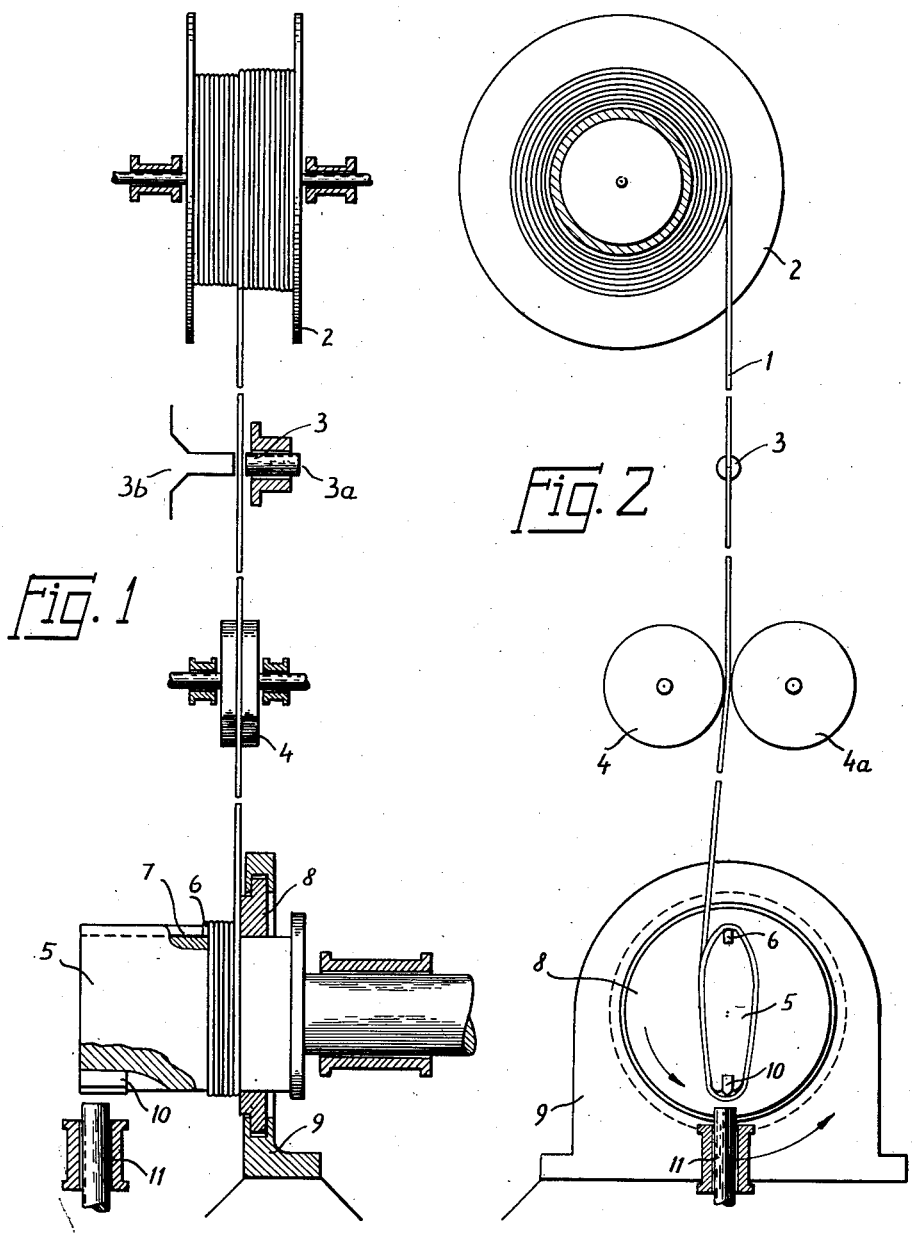
INVENTOR:
GEORG HAMMERSCHLAG
BY A. John Michel
ATTORNEY.

April 28, 1953 G. HAMMERSCHLAG 2,636,523
MACHINE FOR MANUFACTURING MASS ARTICLES OF BENT WIRE
Filed Feb. 28, 1950 5 Sheets-Sheet 2
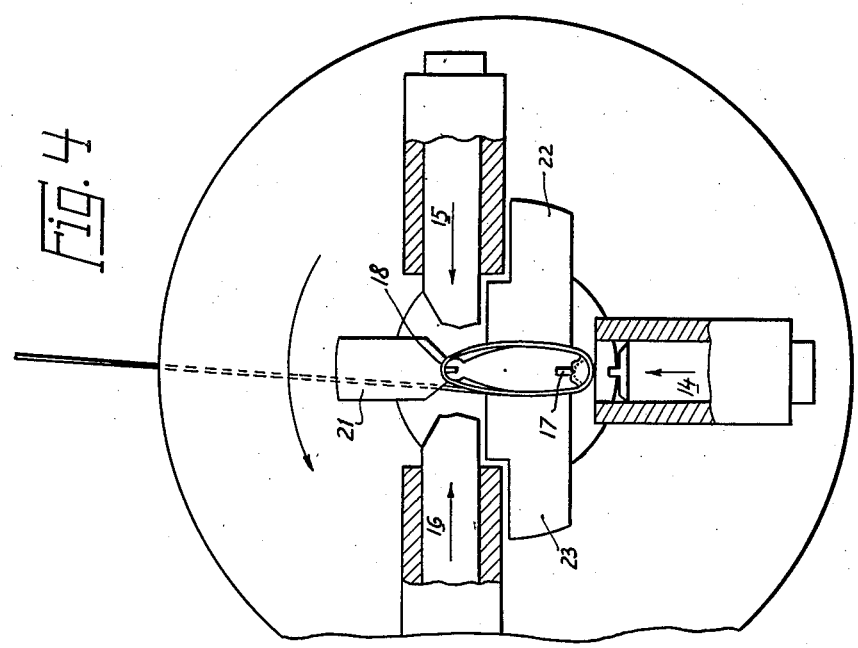
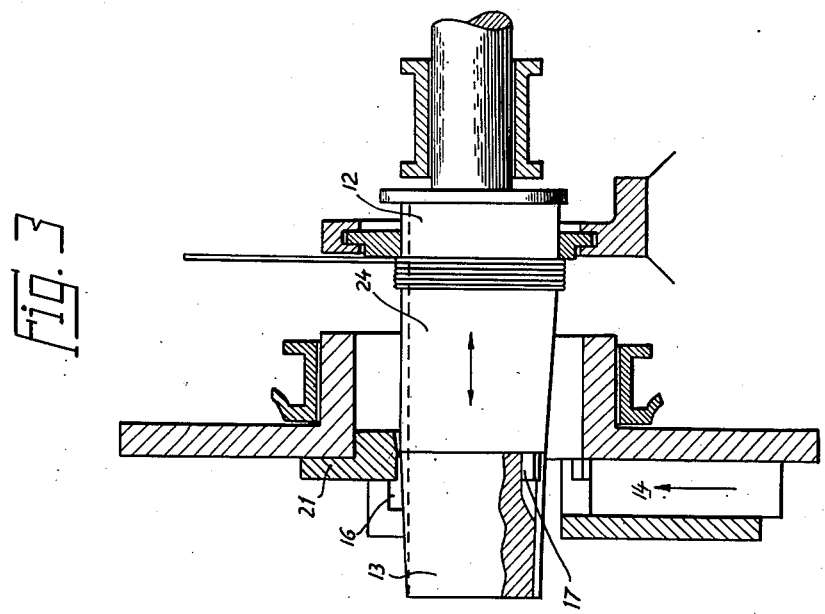
INVENTOR.
GEORG HAMMERSCHLAG
BY
A. John Michel
ATTORNEY April 28, 1953 G. HAMMERSCHLAG 2,636,523
MACHINE FOR MANUFACTURING MASS ARTICLES OF BENT WIRE
Filed Feb. 28, 1950 5 Sheets-Sheet 3

INVENTOR.
GEORG HAMMERSCHLAG
BY A. John Michel
ATTORNEY

INVENTOR.
GEORG HAMMERSCHLAG
BY A. John Michel
ATTORNEY

Patented Apr. 28, 1953

2,636,523

UNITED STATES PATENT OFFICE 2,636,523

MACHINE FOR MANUFACTURING MASS ARTICLES OF BENT WIRE

Georg Hammerschlag, Bilthoven, Netherlands, assignor, by mesne assignments, to Parker Machine Co., Inc., Brooklyn, N. Y.

Application February 28, 1950, Serial No. 146,746
In the Netherlands March 3, 1949

9 Claims. (Cl. 140—71)

1

The present invention relates to a machine for manufacturing mass articles of bent wire, such as spring elements for hair curlers, hair pins, door hooks and the like.

It is old to manufacture such articles by what may be called a purely pressing or moulding method which means that after feeding a piece of wire to be shaped by a pair of pincers or a set of transporting rollers, it is first cut off and then bent round a stationary die or shaped upon the die and finally ejected.

The novel machine according to the invention can best be described as a winding machine because the wire is wound on a rotating mandrel, shaped on that mandrel and finally the several windings of the wire coil thus formed are separated from each other wholly or partly by means of notches.

This machine is much more efficient than the one hitherto used because the machine is not interrupted by cutting off wire pieces and is therefore continuous. The wire needs not be straightened and specially transported because the rotating winding mandrel pulls the wire. The paths of pressing dies for bending concave parts in the wire form to be made are relatively small and cause no appreciable inertia forces. The ejection automatically takes place because the bent wire articles are discharged in series in helicoidal form from the mandrels.

The machine according to the invention comprises helicoidally winding wire on a mandrel which is rotated about an axis parallel to its generatrix, the step of transporting the wound wire coil on each rotation of the mandrel in longitudinal direction, such that the space for taking up the next wire winding on the mandrel is cleared and the step of transporting the wire coil after being wound on the mandrel to a further mandrel part rotating jointly with the first and subjecting the wire coil there to deformations such as the shaping of concave parts, notching, cutting, etc. by means of dies rotating with the mandrels.

In the drawing:

Figures 1 and 2 are diagrammatical views at right angles of a mechanism for illustrating one step in the method according to the invention.

Figs. 3 and 4 show a side view, partly in section, and a front view of the winding and forming parts of a machine in accordance with the invention;

Figure 5:
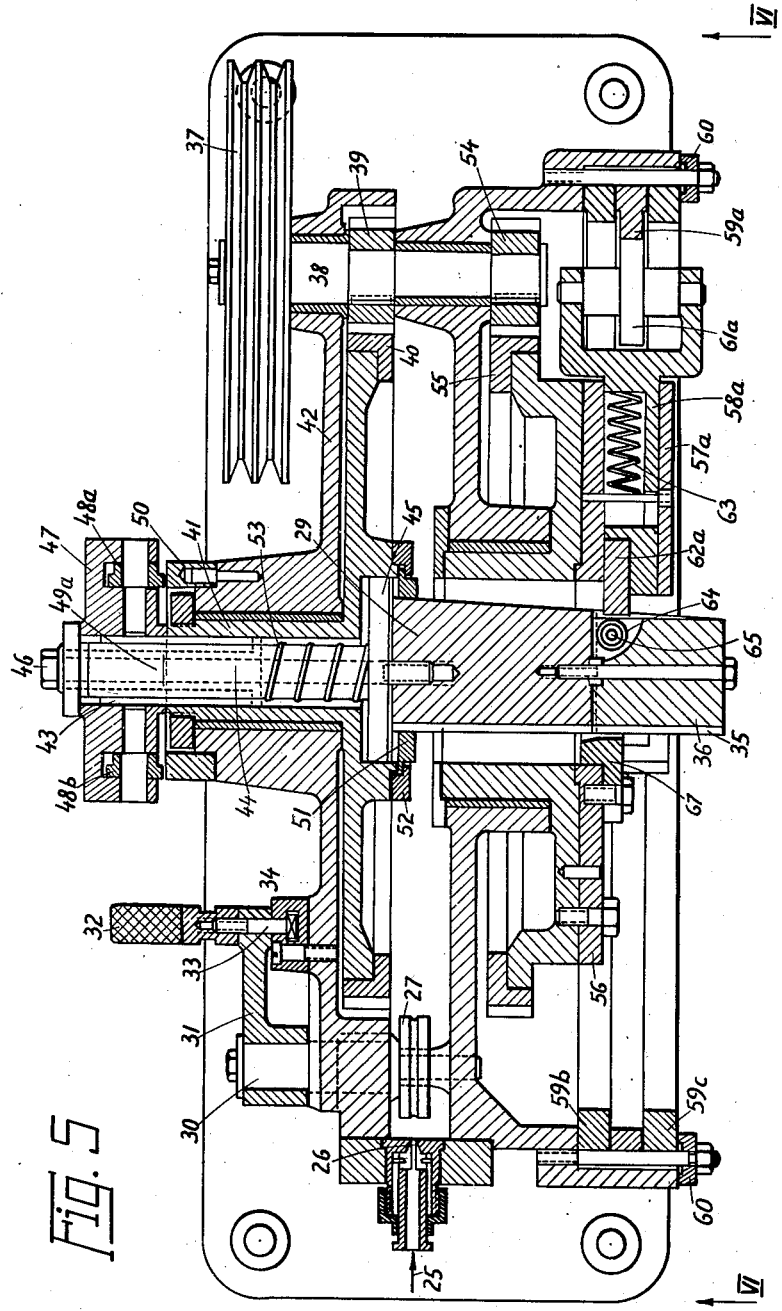
Fig. 5 is a section of a machine taken along line V—V of Fig. 6.
Figure 7:
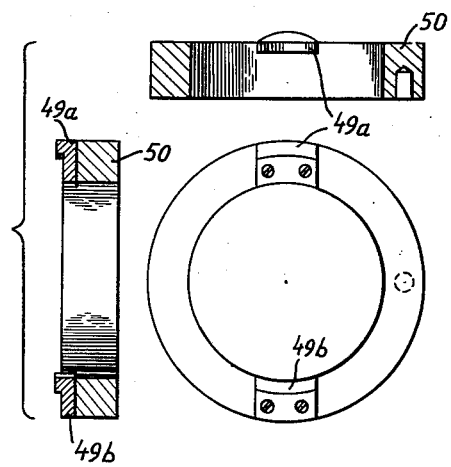
Figure 8:
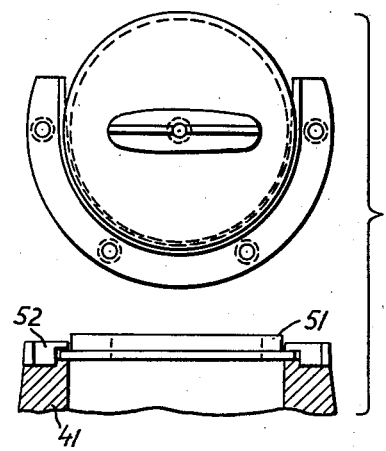

2 viewed in the direction of arrows VI—VI of Fig. 5;

Figs. 7 and 8 show details of the machine, in front view and section; and

Figure 9:
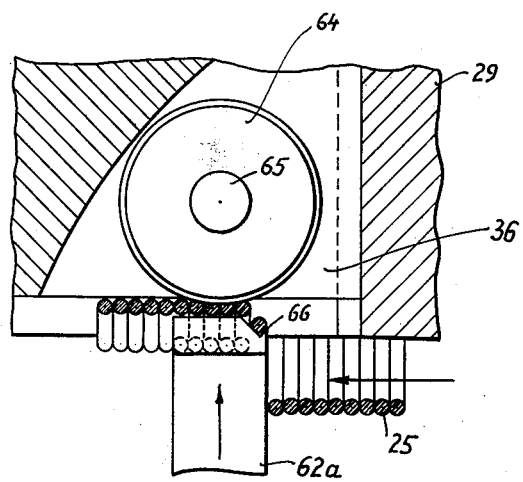

Fig. 9 illustrates a specific embodiment of a shaping die.

The wire 1 is stored on a rotatable reel 2 and is subjected to brake action at 3. Part 3a exerts pressure on part 3b. The wire then passes between two guide rollers 4 and 4a and is wound on a mandrel 5 of cylindrical shape which is entirely convex in section and rotates in the direction of the arrow D (Fig. 2). This winding takes place as follows:

The end 6 of the wire is bent at a right angle and inserted in an axial groove 7 of the mandrel 5 so that the wire coil can be shifted along by the rotating mandrel. When some windings of the wire coil have already been wound, they will automatically ensure the further winding on of the wire and the end 6 travels during winding, in the direction of the arrow H in the slot 7 of the mandrel 5. A so-called stripper 8 which surrounds the mandrel 5 rotates with it but is axially stationary by reason of a fixed bearing 9 encircling its edge. The mandrel 5 in addition to its rotation also performs a short reciprocating movement (translation) in the direction of the arrow L. This latter movement synchronises with its movement of rotation so that on each revolution of the mandrel the wound wire coil during the stroke of the mandrel to the right is shifted forward along the mandrel by the stripper 8 and during the return stroke to the left between the ejector and the wire coil a free space adapted to receive a fresh winding of the thread is formed.

If the object were merely to turn out a purely convex wire shape the wire coil would only further require to pass the cutting edge of a knife 10 connected with the mandrel, the coil being pressed against this knife 10 by a plunger 11 which rotates synchronously with the mandrel and after each revolution performs an operative stroke.

If, however, a wire article is to be produced which is also partly concave in shape, the wire coil is also wound first on a purely convex mandrel 12 (see the diagrams according to Figures 3 and 4 which are also viewed at right angles), is then passed from this mandrel on to a further mandrel 13 secured to the mandrel 12 which imparts the final shape with the concave part(s) to the wire coil because slidable pressing dies 14, 15, 16 which rotate with the mandrel effect during each revolution a stroke against the mandrel 13. The notching takes place as already described in Figures 1 and 2, that is the wire coil is passed over a notching knife 17 and notched or cut by a die or plunger which strikes on it. If the wire form is, as shown for example in Figures 3 and 4, to be notched or cut in one of its concave parts the pressure die 14 can be a notching or cutting die.

In order that the transport of the wire coil from the winding mandrel 12 to the pressing mandrel 13 can take place it is necessary that the periphery of the pressing mandrel shall lie within the periphery of the winding mandrel. In most cases it is desirable to form the periphery of the winding mandrel in such a way that, at various points 18, 19, 20 (see Figures 3 and 4) it reaches the periphery of the pressing mandrel, so that the latter itself completely undertakes the support and guiding of the wire coil, but it is also possible by jointly rotating shaped members 21, 22, 23 to support the wire coil externally on its leaving the winding mandrel, and combinations in this respect are also possible. Furthermore, the most frequent case will be that the peripheral length of the pressing mandrel is equal to the periphery of the winding mandrel. That, however, is not absolutely necessary. For example, if relatively small concave recesses need only be applied locally it is possible to support and guide the wire coil externally after leaving the winding mandrel and to give the pressing mandrel a smaller periphery which serves only locally as the pressing form. Vice versa it is also conceivable to make the periphery of the pressing mandrel greater than that of the winding mandrel, when it is intended for example that the wire shall, after having been previously notched, be torn apart by tension, when the wire is shaped by a final operation.

It is sometimes difficult from a point of view of design to put the place where the concave parts of the wire form are shaped close to the place where the winding is done, so that a transition or connecting member 24 of greater or smaller length serves to guide the coil from the winding mandrel to the shaping mandrel. In order to facilitate transport over this long part it is necessary to make this part tapering and the required taper is determined by the fact that the periphery of the pressing (shaping) mandrel lies within that of the winding mandrel. Furthermore, the wire coil from this pressing (shaping) mandrel can again be transported by way of a tapering intermediate member to a second or third pressing mandrel so that further shapings can be effected and even very intricate shapes be obtained as a final product. Generally, one pressing mandrel with three to four corresponding pressing dies will be amply sufficient but the many possibilities which the above method affords must be emphasized.

Figure 6:
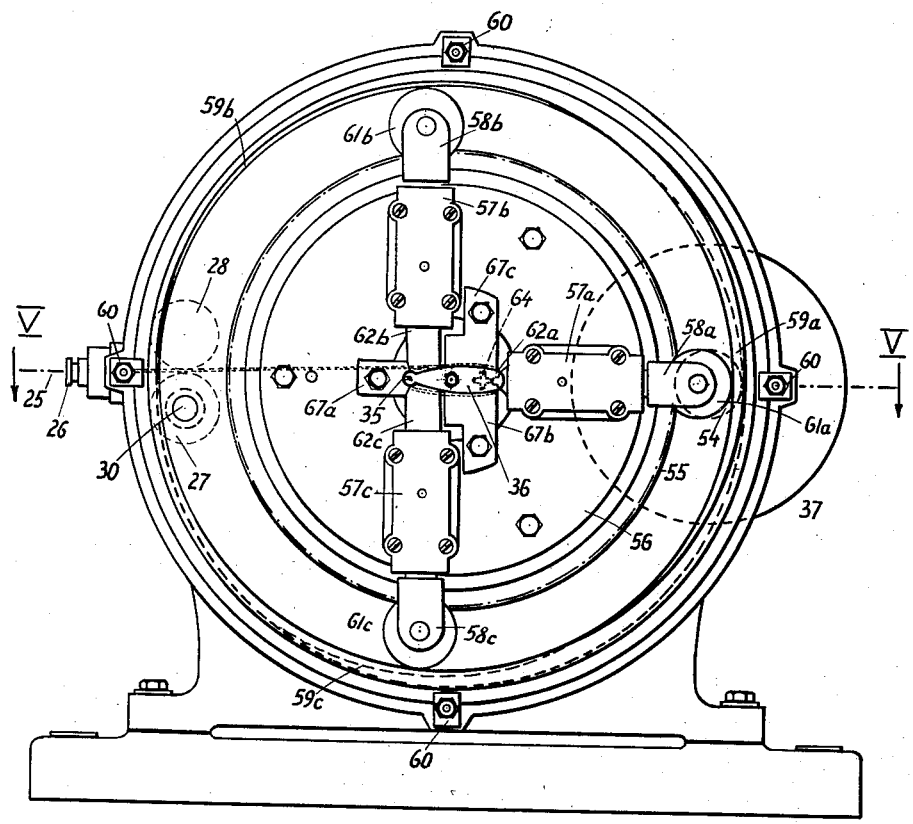
Fig. 6 is a front view of the machine of Fig. 5.

Now Figures 5 and 6 illustrate a machine by means of which the above described wire shaping method can be carried into effect. This machine is equipped for bending wire bows, such as those used for hair-curling pins. The machine can of course also be provided with a device for other forms of wire articles and the curling pin bow is only to be regarded as an example. Figure 5 shows the machine in a section lengthwise of the mandrel according to V—V of Figure 6 while Figure 6 is a front view in the direction of the arrows VI—VI of the machine.

The wire 25 passes a brake 26, enters between two guide rollers 27 and 28 and is then wound on a winding mandrel 29. In the machine given by way of example the brake 26 is constructed as a conical chuck. This, however, is quite subsidiary and any other braking device can be used according to the wire profile to be worked and the quality of the wire. The center distance of the guide rollers 27 and 28 is adjustable by means of an excentric shaft 30, a lever 31 and a handle 32, the position of the rollers being fixed by securing the lever 31 and the handle 32 with the screw 33 on a segment shaped ring with the T-slot 34. The guide rollers 27 and 28 can have a straight generatrix or be profiled according to whether a further profile is to be given to the wire or not. It is therefore possible for example also to use common wire with round profile, and to flatten it by the rollers 27 and 28 or to give it another profile. By fitting more than one pair of rollers between which the wire passes, even substantial changes of the wire profile may be effected.

The winding mandrel 29 has a groove 35, just as wide as the thickness of the wire to be worked. This groove extends into an adjoining pressing mandrel 36, so that before the beginning of the winding process a rectangularly bent end of the wire is carried along by the mandrel 29 and later by the mandrel 36 and is finally discharged from the machine. The winding mandrel 29 is only cylindrical in the short part where the wire travels, afterwards it tapers towards the pressing mandrel 36 which itself, after having been cylindrical for a short distance tapers in order to give the wire coil an opportunity of travelling smoothly outwards.

The mandrels are driven by a pulley 37, a shaft 38 and a pinion 39 which drives a gear 40. The gear 40 is journalled with its hollow hub 41 in the frame 42 and is coupled with a shaft 44 by means of a pair of keys 43. The shaft 44 is provided with a flange 45 and on the latter the winding mandrel is secured by screw 46 and a frame made on the flange 45 which enters a groove on the winding mandrel, and is thus driven. By this construction it is possible to impart to the mandrels in addition to the rotation a short axial reciprocating movement effecting the transport of the wire coil, because at the end of the shaft 44 there is secured and rotates with it the transporter 47 which once during each revolution travels with a couple of rollers 48a and 48b over a couple of cams 49a and 49b which are mounted on the ring 50. The ring 50 is stationary and secured to frame 42. Thus during each revolution the mandrel is shifted axially by the height of the cam and a stripper 51 which surrounds the winding mandrel sharing in its movements and therefore also rotates with the mandrel but is held axially by a ring 52, presses the wound wire coil onward by an amount determined by the height of the cams. After the rollers having passed the cams the spring 53 forces back the shaft 44 with the mandrels so that a free space on the winding mandrel is formed for receiving the following winding of the wire coil.

Figure 7 shows somewhat more clearly in plan view and in sections the ring 50 with the two cams 49a and 49b which are at different distances from the center of the ring so that the rollers 48a and 48b only run once per revolution over the cams 49a and 49b and therefore the transport of the wire coil also only takes place once per rotation.

Figure 8 shows the construction of the ring 52 with the stripper 51 in two views at right angles. This ring is open to one side. Therefore the stripper 51 can easily be changed when setting the machine for other work. On the shaft 38 there is a second pinion 54 which by way of the gear 55 drives a disc 56 synchronously with the mandrel. A disc 57 carries guides 57a, 57b, 57c for slides 58a, 58b, 58c which operate shaping or cutting or notching dies 62a, 62b, 62c. These dies receive the movement in their pressing direction which may be more or less radial, from the corresponding excentric rings 59a, 59b, 59c which are mounted in the frame and are clamped by four clamping plates 60 after adjustment of the right position relative to the direction of pressing. On these excentric rings travel rollers 61a, 61b, 61c which are mounted in forks of the slides 58a, 58b, 58c moving the latter and therefore also the dies 62a, 62b, 62c in their direction of pressure so that on each revolution each punch performs a stroke. The return of the slides 58a, 58b, 58c with dies or rollers or the operative connection between rollers and excentric rings is ensured by the pressure springs 63, assisted by the centrifugal force generated by the revolution of the slides. The die 62a is both a shaping and a notching die. At its innermost dead point it presses on a notching knife 64. The latter is preferably constructed as a round disc with a sharp periphery mounted on a shaft 65 in a groove of the shaping mandrel. On each transporting move of the wire coil this notching disc is in this way somewhat rotated. Thus on each notching stroke another point of its periphery comes into operation with the result that its life is very long as compared with a knife stationarily secured to the mandrel.

The shaping dies have one further feature. In order to prevent, especially in working wire of round profile, the wire from slipping off the shaping die in backward direction (see Figure 9 which shows on a large scale the operation of the shaping die 62a together with the mandrel 36) and thus coming to lie under the wire winding to be shaped by the following stroke, the shaping dies are provided with a shallow groove 66 on their inner side, so that one wire winding caught in the groove and conducted in the direction of movement of the die is preshaped and thus provides support for a winding already shaped which is at the same time finally shaped.

As has already been said, it is often an advantage and even necessary to support the wire coil not only by the shaping mandrel but also by guide pieces from outside, above all when the direction of pressure of the shaping die is not symmetrical. Thus Figure 6 shows three guide pieces 67a, 67b, 67c of which the guide piece 67a must be considered as essential in order to provide support against the unilateral pressure of the shaping and notching die 62a, while the guide pieces 67b and 67c, increasing regularity in the product are a useful addition to the guiding action.

Having now described the objects and the nature of my invention what I claim is:

1. In a machine for the continuous manufacture of bent wire articles comprising a supply of continuous length of wire; a rotating coiling mandrel of convex cross section arranged to receive the length of wire; suitable fastening means arranged on the periphery of the coiling mandrel for holding the end of the wire; means for imparting an axial reciprocating movement to the mandrel corresponding to the thickness of the wire after each full rotation of the mandrel, thereby advancing the wire along the mandrel to clear space for the next convolution of wire and to form a helicoidal wire coil on the mandrel: a forming mandrel connected to the coiling mandrel and rotating therewith, said forming mandrel being of different cross section and with no point of the periphery of the forming mandrel lying outside the periphery of the coiling mandrel; an annular disc mounted substantially coaxially with the forming mandrel, said disc being arranged to rotate around and in unison with the forming mandrel; means for rotating said disc at substantially the same speed as said mandrel; at least one straight substantially radial slide-way on said disc; a die slide slidably mounted in each slide-way; a roller attached to the outer end of each die slide; a stationary cam ring for each roller, said cam ring being mounted around said forming mandrel and constituting a track for the roller; spring means to support the centrifugal force holding each roller in contact with the cam track; and a forming die fixedly mounted on each die slide and moving into cooperation with the forming mandrel at points determined by said cam tracks to impart a predetermined shape to each convolution of said wire.

2. Machine for the continuous manufacture of bent wire articles, comprising a supply of continuous length of wire, a mandrel having a winding part and a forming part spaced axially therefrom, means for guiding the continuous length of wire onto the winding part of the mandrel to form a coil thereon, means for rotating the mandrel, means for axially reciprocating the mandrel, means at least partially surrounding the mandrel to engage the wound coil to advance the same on the axial reciprocating movement of the mandrel, a slide carrier located around the forming part of the mandrel, means for rotating the slide carrier at substantially the same speed as the mandrel, forming dies slidably mounted on said slide carrier and adapted to cooperate with said forming part of the mandrel, and means for reciprocating said forming dies.

3. A machine as defined in claim 2, comprising cutting means located at the forming part of the mandrel for severing the wire at a predetermined point before it moves off the forming part.

4. A machine as defined in claim 2, wherein the cross section of said forming part of the mandrel is at least partly concave.

5. A machine as defined in claim 1, comprising a laterally stationary thrust ring rotating with said coiling mandrel and mounted around said mandrel at the point where the wire is received by the mandrel.

6. A machine as defined in claim 2, wherein the peripheries of the winding and the forming parts of the mandrel are in contact with each other at at least one point so that the generatrices of the two parts of the mandrel form a continuous guide for the wound wire coil moving from the winding to the forming part.

7. A machine as defined in claim 2, comprising at least one axially stationary guide element revolvable with said forming part of the mandrel to support the wound wire externally during forming.

8. A machine as defined in claim 2, wherein at least one of said forming dies is provided in its pressure surface with a groove not exceeding in depth the thickness of the coiled wire and adapted to engage a wire convolution so that the wire convolution in said groove forms a support for the preceding convolution in the axial direction.

9. A machine as defined in claim 2, wherein there is provided a connecting section between the winding and the forming parts of the mandrel, said section tapering from the winding to the forming part.

GEORG HAMMERSCHLAG.

References Cited in the file of this patent

UNITED STATES PATENTS

| Number | Name | Date |
|---|---|---|
| 904,252 | Evans | Nov. 17, 1908 |
| 1,501,343 | Holmquist | July 15, 1924 |
| 1,616,947 | Bender | Feb. 8, 1927 |
| 1,920,155 | Fisher | July 25, 1933 |
| 1,987,333 | Geer | Jan. 8, 1935 |
| 1,987,334 | Geer | Jan. 8, 1935 |
| 2,082,079 | Palucki | June 1, 1937 |
| 2,324,115 | Schultz | July 13, 1943 |
| 2,406,130 | Boyce | Aug. 20, 1946 |
| 2,455,549 | Benjamin | Dec. 7, 1948 |
| 2,467,227 | Potter | Apr. 12, 1949 |
| 2,527,518 | Benson | Oct. 31, 1950 |
| 2,513,164 | Genua | June 27, 1950 |